United States Patent
Chen et al.

(10) Patent No.: US 11,546,443 B2
(45) Date of Patent: Jan. 3, 2023

(54) CONNECTED FOCUS TIME EXPERIENCE THAT SPANS MULTIPLE DEVICES

(71) Applicant: MICROSOFT TECHNOLOGY LICENSING, LLC, Redmond, WA (US)

(72) Inventors: Liang Chen, Sammamish, WA (US); Mikalai Andreyanau, Mill Creek, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/019,068

(22) Filed: Sep. 11, 2020

(65) Prior Publication Data

US 2022/0086246 A1  Mar. 17, 2022

(51) Int. Cl.
| | |
|---|---|
| *H04L 67/55* | (2022.01) |
| *H04L 67/14* | (2022.01) |
| *H04L 67/306* | (2022.01) |
| *H04L 67/52* | (2022.01) |
| *H04L 67/54* | (2022.01) |

(52) U.S. Cl.
CPC .............. *H04L 67/55* (2022.05); *H04L 67/14* (2013.01); *H04L 67/306* (2013.01); *H04L 67/52* (2022.05); *H04L 67/54* (2022.05)

(58) Field of Classification Search
CPC . H04L 12/1895; H04L 51/24; H04L 41/0604; H04L 67/14; H04L 67/18; H04L 67/24; H04L 67/26; H04L 67/306
See application file for complete search history.

(56) References Cited

U.S. PATENT DOCUMENTS

| | | | | |
|---|---|---|---|---|
| 10,149,278 | B2 * | 12/2018 | Borges | ..................... H04L 51/20 |
| 10,321,195 | B1 * | 6/2019 | Nasir | ................... H04N 21/4668 |
| 2008/0168391 | A1 * | 7/2008 | Robbin | ................... G06F 16/182 |
| | | | | 715/810 |
| 2010/0115033 | A1 * | 5/2010 | Geffner | ................ H04M 1/7243 |
| | | | | 709/206 |

(Continued)

OTHER PUBLICATIONS

Rich, J. "How to Do Everything: iCloud, Second Edition". Chapters 3, 11, and 14. pp. 1-38. (Year: 2014).*

(Continued)

*Primary Examiner* — John M Macilwinen
(74) *Attorney, Agent, or Firm* — Jacob P. Rohwer; Newport IP, LLC

(57) ABSTRACT

Disclosed herein is a system configured to provide a connected focus time experience that spans multiple different devices. The connected focus time experience is enabled via an account the user leverages to log into the multiple different devices. For instance, when the user has configured a focus mode for a focus session on a first device (e.g., a laptop device) into which the user is logged via the account, the account can be then used to identify a second device (e.g., a smartphone device) into which the user is also logged via the account. Consequently, an instruction can be provided to configure the focus mode for the focus session on the second device. The focus mode prevents notifications from being output during the focus session, so user distractions and interruptions can be avoided or limited.

16 Claims, 13 Drawing Sheets

(56) References Cited

U.S. PATENT DOCUMENTS

| | | | |
|---|---|---|---|
| 2011/0247055 A1* | 10/2011 | Guo | G06F 21/34 |
| | | | 726/4 |
| 2013/0185346 A1* | 7/2013 | Lee | H04L 67/1095 |
| | | | 709/201 |
| 2013/0332721 A1* | 12/2013 | Chaudhri | G06F 3/048 |
| | | | 713/100 |
| 2013/0339436 A1* | 12/2013 | Gray | H04L 51/24 |
| | | | 709/204 |
| 2014/0282992 A1* | 9/2014 | Clancy, III | G06F 21/44 |
| | | | 726/9 |
| 2015/0195692 A1* | 7/2015 | Chow | H04M 19/04 |
| | | | 455/414.1 |
| 2015/0326823 A1* | 11/2015 | Oh | H04N 7/147 |
| | | | 348/14.07 |
| 2016/0050642 A1* | 2/2016 | Brown | H04W 8/22 |
| | | | 455/418 |
| 2016/0119389 A1 | 4/2016 | Gil et al. | |
| 2016/0360031 A1* | 12/2016 | Rauenbuehler | H04L 67/26 |
| 2017/0273050 A1* | 9/2017 | Levak | G01N 33/56966 |
| 2018/0012507 A1* | 1/2018 | Jeong | G09B 7/08 |
| 2019/0213519 A1 | 7/2019 | Metz et al. | |
| 2019/0251860 A1 | 8/2019 | Lawrenson et al. | |

OTHER PUBLICATIONS

Hyunsung Cho, Jinyoung Oh, Juho Kim, and Sung-Ju Lee. 2019. Sender-Controlled Mobile Instant Message Notifications Using Activity Information (demo). In Proceedings of the 17th Annual International Conference on Mobile Systems, Applications, and Services (MobiSys '19). (Year: 2019).*

Gusgard, O. "Application development for the Apple Watch". Metropolia University of Applied Sciences. Thesis, pp. 1-50. (Year: 2018).*

"International Search Report & Written Opinion issued in PCT Application No. PCT/US21/034676", dated Sep. 23, 2021, 16 Pages.

* cited by examiner

DISTRACTIVE DEVICE 122

CONNECTED FOCUS TIME EXPERIENCE THAT SPANS MULTIPLE DEVICES

BACKGROUND

Research has shown that an information worker is typically interrupted by a device notification every three minutes. When one of these device notifications interrupts the information worker at a time when the information worker is focused on a task, the research shows that it can take the information worker up to twenty-five minutes to completely refocus on the task. The source of many of these interruptions is not the device with which the information worker is engaged in order to work on the task (e.g., a laptop device or a desktop device), but rather a secondary device such as a smartphone device, a smartwatch device, or other types of devices that are typically on or close to the information worker throughout the course of a day.

There are conventional tools to help users stay focused on a task. For example, some devices allow for a focus timer (e.g., a "do not disturb" time period) to be implemented. However, these conventional tools are limited because they only work on one device, e.g., the device with which the user is engaged in order to work on the task. These conventional tools fail to implement a coordinated approach for the focus timer across multiple devices. To illustrate the shortcomings, even though the aforementioned focus timer may suppress a notification from an application installed on the device with which the user is engaged in order to work on the task, the same notification may be passed through and displayed via another version of the same application installed on a second user device such as a smartphone device, a smartwatch device, or other type of device that is typically on or close to the user throughout the course of a day. Thus, the user is still interrupted even though the user implemented the focus timer on the device with which the user is engaged in order to work on the task.

It is with respect to these and other considerations that the disclosure made herein is presented.

SUMMARY

The techniques disclosed herein describe a system configured to provide a connected focus time experience that spans multiple different devices. The connected focus time experience is enabled via an account the user leverages to log into the multiple different devices. For instance, when the user has configured a focus mode for a focus session on a first device (e.g., a laptop device, a tablet device, a desktop device, etc.) into which the user is logged via the account, the account can be used to identify a second device (e.g., a smartphone device, a smartwatch device, etc.) into which the user is also logged via the account. Consequently, an instruction can be provided to configure the focus mode for the focus session on the second device as well. Stated alternatively, the focus session can be extended or pushed to additional devices via the use of a common account. The account can be an operating system account or a device-level account so that it can manage and control the output of notifications from different applications installed on a device.

This connected focus time experience that spans multiple different devices of the user offers a more comprehensive approach compared to the conventional tools discussed above in the "Background" section because it can effectively and efficiently be implemented across multiple devices which are capable of interrupting the user, and not just the device the user is engaged with to work on a task. The technical effectiveness and efficiencies of the connected focus time experience discussed herein stem from the fact that the user only has to engage with one device to implement the connected focus time experience across multiple different devices. That is, the user is not required to directly interact with multiple different devices. Previously, the user would be required to set up a first focus timer on a first device (e.g., a laptop device, a tablet device, a desktop device, etc.), and then inconveniently turn his or her attention to a second device (e.g., a smartphone device, a smartwatch device, etc.) and take an additional step of setting up a second, separate focus timer on the second device to ensure that interruptions from the second device can be avoided as well. Using the techniques described herein, the user can effectively and efficiently implement a focus mode for a focus session across multiple different devices via the use of a common account (e.g., an operating system account).

The focus session described herein includes a start time and an end time. The length of a focus session can be a default length (e.g., twenty minutes, thirty minutes, one hour, etc.) or a length that is defined by a user via the input of the start time and the end time. When applied and enforced during the focus session, the focus mode prevents notifications generated by applications installed on a respective device from being output. This enables the user to experience the focus session without interruptions from multiple different devices, or with limited interruptions from the multiple different devices. Furthermore, since the user knows the focus mode is implemented on multiple devices, the user is not tempted to distract himself or herself by checking on other devices for any new notifications. An "interruption" as used herein may also be referred to herein as a "distraction". Both these terms are intended to capture a scenario where the attention of the user is shifted from a current task to an unrelated notification output by a device.

The output of a notification by a device can include the display of the notification on a user interface, the production of an audible sound, and/or other types of user feedback configured to grab the attention of the user (e.g., a device vibration). Each of these outputs are capable of interrupting and distracting the user. Accordingly, the techniques described herein provide an improved way to enable a user to remain focused on a task and to be more productive because distractions are completely removed or are limited as a result of suppressed notifications. In addition to an office setting and work tasks, the techniques can be used to assist in other types of scenarios where focus sessions can make users more productive with respect to completing tasks. For instance, the techniques can apply to a student working on an academic paper, a religious person reading spiritual content on a break, an individual needing some uninterrupted time to complete a household task such as paying bills or filing taxes, and so forth.

A component of a device, such as an operating system, may be configured to output a notification for various types of applications installed on the device. An application can includes system-level functionality (e.g., voice calls, text messages, security monitoring, update configurations, etc.) as well separate applications downloaded and/or installed on a device. Accordingly, different types of applications may include, but are not limited to: voice calling applications, text messaging applications, social networking applications, email applications, security applications, payment applications, video conferencing applications, storage applications, productivity suite applications, specific site applications (e.g., sports news sites, political news sites, financial news sites, streaming sites, shopping sites, travel sites, health sites, educational sites, etc.), web browser applications and/or web "apps", and so forth.

As described herein, using an account that links multiple different devices, a user has the option to select one or more additional devices on which a focus mode is to be configured. This ability is provided via a first device, which in many scenarios is likely a device with which the user intends to engage to work on a task. The first device may be referred to herein as a "working" device. The working device may have resources (e.g., larger display screens, more processing power, a larger amount of storage space, etc.) conducive to working on a task more efficiently and effectively. Accordingly, in many scenarios, the working device may be a desktop device, a laptop device, or a tablet device.

The user engages with the working device to initiate a focus mode for a focus session. The focus mode prevents notifications from being output during the focus session. Stated alternatively, the focus mode suppresses or "blocks" notifications during the focus session. When the user configures the focus mode on the working device, the system described herein can cause a list of second devices associated with, or registered to, the account of the user to be displayed for selection. As previously mentioned, to improve the user experience, this list is displayed via the working device so the user does not have to switch gears and directly engage with a second device. For purposes of this disclosure, a second device may be referred to herein as a "distractive" device due to its potential to distract the user during the focus session. The user can provide a selection of one or more second devices from the list, which confirms the potential distractive nature of the selected devices. In many situations, these distractive devices may be different types of devices compared to the working device. For example, a distractive device may be one that the user wears or keeps on himself or herself throughout the course of the day (e.g., a smartphone device, a smartwatch device, etc.). The instruction to configure the focus mode can be provided to each distractive device selected by the user.

In various examples, the user may select all the second devices on the list that are currently associated with, or registered to, the account in order to have the focus mode extended to all of the second devices. A default setting may also automatically designate all of the second devices on the list that are currently associated with, or registered to, the account as distractive devices in order to have the focus mode extended. Alternatively, the user may have valid reasons to not select one of the second devices on the list so that the focus mode is not configured and the non-selected device is still able to output notifications during the focus session. For instance, a user may have a health condition and one of his or her devices may somehow be involved in monitoring health data and outputting corresponding notifications that are important to the user's health (e.g., heart rate is too high, blood sugar is too low, etc.).

In an embodiment described herein, the system can use location data to determine which second devices are likely to be distractive devices. That is, the system can determine that a location of a second device is within a predefined distance of a location of the first device. The predefined distance is established to distinguish between a location where a notification output by the second device is likely to interrupt the user and thus needs to be blocked, and a location where the notification output by the second device is not likely to interrupt the user and thus does not need to be blocked. The predefined distance may be different depending on the environment in which the user is currently located. For example, a predefined distance used in a larger home setting may be greater than a predefined distance used in a smaller office setting, or vice versa. If the location of the second device is within the predefined distance of the location of the working device, the second device can be identified as a likely distractive device and an indication of such an identification can be displayed on the working device. In contrast, if the location of the second device is outside the predefined distance of the location of the working device, the second device may be identified as a likely non-distractive device and an indication of such an identification can be displayed on the working device.

In additional examples, the system presents the user with the option to select which applications, installed on a respective device for which the focus mode is to be configured, is to have their notifications prevented from being output (e.g., blocked or suppressed). Again, to improve the user experience, this selection can be implemented via the working device so that the user does not have to switch gears and turn his or her attention to engage directly with a distractive device. Accordingly, the system described herein causes a list of applications installed on a distractive device to be displayed for selection via the working device. The user can then provide a selection of one or more applications from the list of applications. The instruction to configure the focus mode can be provided to the distractive device based on the selection of specific applications. The selection, or lack thereof, enables notifications from particular applications to still be output during the focus session. Going back to the example mentioned above, but on a more granular application level, a user may have a health condition and a health application installed on a distractive device may somehow be involved in monitoring health data and outputting corresponding notifications that are important to the user's health (e.g., heart rate is too high, blood sugar is too low, etc.). Accordingly, the user may want to ensure that notifications from this health application are not suppressed.

Provided that different devices are involved it is possible that an application installed on a distractive device does not have a corresponding version of the application installed on the working device. Consequently, the disclosed system provides an effective and efficient way for a user to extend a focus mode, for a focus session to be implemented on a first device, to applications that are not installed on the first device but rather on a second device that is identified as being a distraction for a focus session via the use of a common account.

In response to configuring a focus mode on a distractive device, but before the focus session starts, the system can also perform an analysis of the distractive device and/or the selected applications for which notifications are to be suppressed in order to identify future events for which a time-based notification is scheduled to be output on the distractive device during the focus session. For example, a user may have a personal calendar application on a smartphone device. The personal calendar application may not be installed on a working device of the user nor synched to a work calendar application installed on the working device, and thus, the scheduled events on the personal calendar of the smartphone device may not be visible to the user via the working device. Accordingly, the system may be configured to remind the user, before the focus session begins, of a scheduled event from an application on the distractive device that may occur during a focus session. In a specific example, the user may have forgotten that he or she needs to perform a personal task scheduled during the focus session such as picking up a pet from the veterinarian. The reminder may ask the user if the scheduled event can be ignored or whether the focus session needs to be changed so the user can accommodate a previous commitment (e.g., telling his or her spouse that he or she will pick up the pet from the veterinarian).

The system described herein is also configured to present the user with the option to use the display screen of a distractive device to display information for the focus session. This further reduces the amount of distraction on the working device with which the user is engaged to focus on and complete a task. For example, the information can include a remaining amount of time until the focus session expires or until a prescheduled break during the focus session occurs.

In various examples, the system is configured to present a summary of the notifications that were suppressed during the focus session upon expiration of the focus session or during a scheduled break for the focus session. The notifications may be notifications from both a working device and a distractive device. In one example, the summary of notifications is displayed to the user on the working device, so that the user does not need to check different devices in order to see the notifications that were missed while the user was in the focus session. The notifications can be sorted based on a device and/or an application that output the notifications. Moreover, the notifications can be displayed in a prioritized order based on perceived importance. Consequently, the user can quickly catch up on what was missed during the focus session or during a segment of the focus session.

In some embodiments, the system can implement a filter that allows some notifications that should be suppressed to be passed through for output during the focus session. These notifications may be passed through in accordance with a time-sensitive factor or a time-sensitive analysis, and thus, may be referred to herein as a time-sensitive notification. In one example, the time-sensitive factor used by the system to classify a notification as time-sensitive can include a determination that the notification is a repeat notification that has been generated a threshold number of times (e.g., two, three, four, etc.). In this example, the repeat notification is determined to be the same with respect to content (e.g., what is being communicated and why) and/or source (e.g., who sent the communication that caused the notification) as the previous notification. The system is therefore configured to analyze notifications to identify repeat notifications that are the same with respect to content and/or source as a previous notification, and thus, the repeat notification may be indicative of an urgent or emergency situation. In a specific scenario, a spouse may call the user three different times (e.g., the threshold is three), and thus, a notification of the third call can penetrate the filter of the focus mode and be output. Or the spouse may text the user two different times indicating in some form for the user to call back immediately (e.g., the threshold is two), and thus, a notification of the second text message can penetrate the filter of the focus mode and be output. Time-sensitive notifications passed through due to repeat attempts that meet a threshold may be limited to those associated with user identifications (e.g., names, titles, etc.) included on a predefined list of "important" or "favorite" people of a user (e.g., a mother, a father, a spouse, a child, a supervisor, a coach, a counselor, a doctor, etc.).

In another example, the time-sensitive factor used by the system to classify a notification as a time-sensitive notification can include a new time-based event that is scheduled and/or set to occur during the focus session. For instance, perhaps a supervisor schedules a last second meeting during the focus session, and thus, the user could not have been aware of the meeting at the onset of the focus session. Accordingly, the system can analyze the content of the meeting request received during the focus session to identify that the meeting time is also during the focus session and the system can pass through the meeting request so the user does not miss an important discussion with his or her work team. Or perhaps a spouse has an unexpected matter to attend to and therefore sends a text message indicating a change of plans and requesting that the user pick up the kids from school, which would need to happen during the focus session. Accordingly, the system can analyze the content of the text message received during the focus session to identify that the kid pickup time is also during the focus session and the system can pass through the text message so the spouse can attend to the unexpected matter, and the user can change his or her schedule so the kids are not left waiting for a ride at school. Similar to the discussion above, time-sensitive notifications passed through due to a time-based event that occurs during the focus session may be limited to those associated with user identifications included on a predefined list of important or favorite people of a user.

In yet another example, the time-sensitive factor used by the system to identify or classify a notification as a time-sensitive notification can include a location-based emergency or urgent warning with important information from an official source such as a government entity (e.g., a tornado has touched down close to the device, an active shooter has been reported near the device, geological sensors have detected an earthquake, an AMBER ALERT has been issued, etc.).

In further embodiments, when a device is in the focus mode, the system described herein is configured to automatically generate a response message to a notification, the response message indicating that the user is in the focus session. The response message can be sent to the source of the notification (e.g., a user that sent an email or a text message). Furthermore, when the device is in the focus mode, the system can automatically change an application status indicator for the user to indicate the user is busy and does not want to be distracted.

As a result of the techniques described herein, resource use associated with a distractive device can be avoided or limited (e.g., batter power is conserved, a number of processor cycles is reduced, storage space is saved, etc.). Furthermore, the chance for an error from user inputs related to a focus session is reduced because the system extends a focus session established on one device to other devices. The technical effectiveness and efficiencies of the connected focus time experience discussed herein stem from the fact that the user only has to engage with one device to implement the connected focus time experience across multiple different devices. That is, the user is not required to directly interact with a distractive device to implement a focus session on the distractive device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for providing a connected focus time experience that spans multiple different devices. The connected focus time experience is enabled via an account the user leverages to log into the multiple different devices. For instance, when the user has configured a focus mode for a focus session on a first device (e.g., a laptop device, a tablet device, a desktop device, etc.) into which the user is logged via the account, the account can be used to identify a second device (e.g., a smartphone device, a smartwatch device, etc.) into which the user is also logged via the account. Consequently, an instruction can be provided to configure the focus mode for the focus session on the second device as well.

The user engages with the first device to initiate the focus mode for the focus session. The focus mode prevents notifications from being output on the first device during the focus session. Stated alternatively, the focus mode suppresses or blocks notifications during the focus session. When the user configures the focus mode on the first device, the system described herein can cause a list of second devices associated with, or registered to, the account of the user to be displayed for selection. The devices displayed on the list are ones for which the user is currently logged into using the account. To improve the user experience, this list is displayed via the first device so the user does not have to switch gears and directly engage with a second device. The user can provide a selection of one or more second devices from the list, which confirms the potential distractive nature of the selected devices. In many situations, these distractive devices may be different types of devices compared to the working device. For example, a distractive device may be one that the user wears or keeps on himself or herself throughout the course of the day (e.g., a smartphone device, a smartwatch device, etc.). The instruction to configure the focus mode can be provided to each distractive device selected by the user.

Various examples, scenarios, and aspects of the disclosed techniques are described below with reference to FIGS. 1-12.

Figure 1:
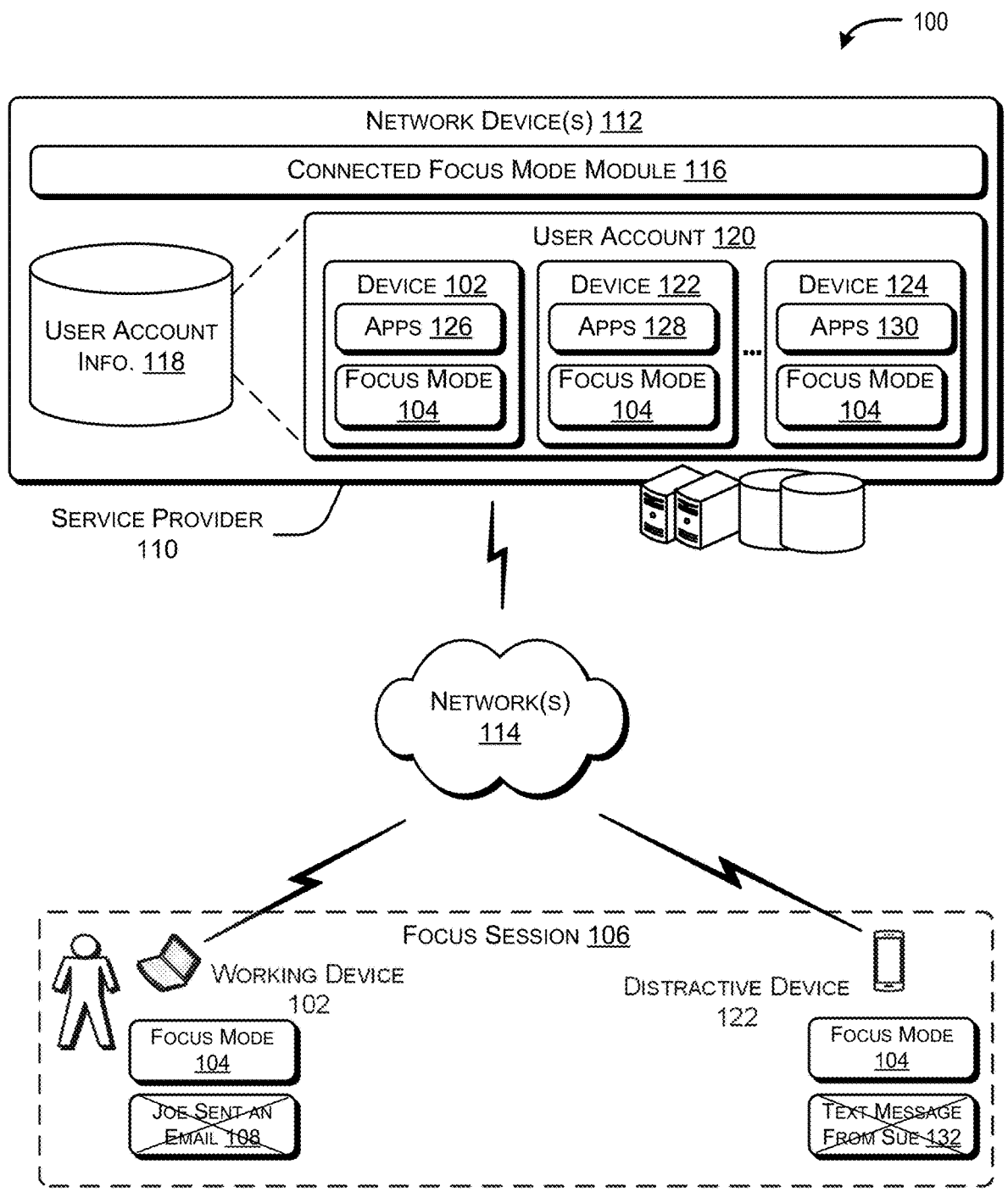
FIG. 1 is a diagram illustrating an example environment in which a connected focus mode that spans multiple devices into which a user is logged via an account can efficiently and effectively be configured using a single device.

FIG. 1 is a diagram illustrating an example environment 100 in which a connected focus mode that spans multiple devices into which a user is logged via an account can efficiently and effectively be configured using a single device. As shown in FIG. 1, a user is engaged with a first device, which may be referred to as a working device 102, to implement a focus mode 104. The focus mode 104 is configured for a focus session 106, or a period of time between a start time and an end time during which the user wants to focus on a task or a project without interruptions, particularly interruptions from device notifications. An "interruption" as used herein may also be referred to herein as a "distraction". Both these terms are intended to capture a scenario where the attention of the user is shifted from a current task to an unrelated notification output by a device.

Accordingly, application and/or enforcement of the focus mode 104 prevents notifications generated by applications installed on the working device 102 from being output during the focus session 106. For instance, a notification 108 that "Joe sent an email" is blocked from being displayed via the working device 102 (as shown via the "X" through the notification 108). The focus mode 104 can be used to help the user be more productive in various types of scenarios. For instance, the techniques can apply to an information worker focusing on a work project, a student working on an academic paper, a religious person reading spiritual content on a work break, an individual needing some uninterrupted time to complete a household task such as paying bills or filing taxes, and so forth.

FIG. 1 further illustrates a service provider 110 that provides a network service via a system comprised of one or more more network device(s) 112. As shown, the network service is provided over various network(s) 114. The network device(s) 112 can include a connected focus mode module 116 and user account information 118. The user account information 118 stores data associated with different accounts for users that have registered to use the network service. In various examples, these accounts can be operating system accounts or device-level accounts that allow a user to register different devices to a common account. Thus, the user can leverage the common account to log into multiple different devices at the same time. Furthermore, a user account is configured to manage and control the output of notifications from different applications installed on a respective device.

FIG. 1 shows that the user account information 118 includes a user account 120, which stores data indicating that the user has registered and/or is currently logged into multiple different devices, such as the working device 102 (e.g., a laptop device), and additional devices 122, 124 (e.g., a smartphone device and a smartwatch device). The number of devices a user can be logged into at a given time is not limited, and can be two, three, four, five, and so forth. In some instances, one of the devices a user is currently logged into, and thus, is associated with the user account 120 can be shared device or a community device (e.g., a whiteboard device in a conference room that is shared by different employees of a company).

When the user configures the focus mode 104 on a first device such as the working device 102, the connected focus mode module 116 enables the user to select individual ones of the additional devices 122, 124 on which the focus mode 104 can also be configured. Alternatively, the focus mode 104 may automatically be configured on the additional devices 122, 124 without user input and in accordance with a default setting. FIG. 1 shows that the focus mode 104 has been configured on device 122 (e.g., a smartphone device), and thus, device 122 is labeled as a distractive device 122.

Each of the devices 102, 122, 124 into which the user is logged using the user account 120 may have different sets of applications installed thereon. For example, while one application may be installed on multiple devices 102, 122, 124 (e.g., different versions of the same application—a mobile version and a desktop version), another application may only be installed on a single one of the devices 102, 122, 124. Accordingly, FIG. 1 illustrates that the working device 102 includes a first set of applications 126, that the distractive device 122 includes a second set of applications 128, and that the additional device 124 includes a third set of applications 130.

An application can includes system-level functionality (e.g., voice calls, text messages, security monitoring, update configurations, etc.) as well separate applications downloaded and/or installed on a device. Accordingly, different types of applications may include, but are not limited to: voice calling applications, text messaging applications, social networking applications, email applications, security applications, payment applications, video conferencing applications, storage applications, productivity suite applications, specific site applications (e.g., sports news sites, political news sites, financial news sites, streaming sites, shopping sites, travel sites, health sites, educational sites, etc.), web browser applications and/or web "apps", and so forth.

When the focus mode 104 is extended to the distractive device 122 using the connected focus mode module 116 after the focus mode 104 has been configured on the working device 102, a notification 132 of a "text message from Sue" is blocked, or prevented from being output (as shown via the "X" through the notification 132).

The length of a focus session 106 can be a default length (e.g., twenty minutes, thirty minutes, one hour, etc.) or a length that is defined by a user via the input of the start time and the end time. This enables the user to experience the focus session 106 without interruptions from multiple different devices 102, 122, 124, or with limited interruptions from the multiple different devices 102, 122, 124. Furthermore, since the user knows the focus mode 104 is implemented on multiple devices 102, 122, 124, the user is not tempted to distract himself or herself by checking on other devices for any new notifications. The ability for a user to provide input via the working device 102 improves the experience because the user does not have to disengage with the working device 102 in order to configure a separate focus session on the distractive device 122. Rather, the user can configure the focus mode 104 for the focus session 106 on the working device 102 and the system of FIG. 1 can ensure that the focus mode 104 is pushed to other devices 122, 124 that may potentially interrupt and/or distract the user via the output of notifications.

The output of a notification by a device can include the display of the notification on a user interface, the production of an audible sound, and/or other types of user feedback configured to grab the attention of the user (e.g., a device vibration). Each of these outputs are capable of interrupting and distracting the user. Accordingly, the connected focus mode illustrated in FIG. 1 provides an improved way to enable a user to remain focused on a task and to be more productive because distractions are completely removed or are limited as a result of suppressed notifications.

In various examples, the network device(s) 112 of the system in FIG. 1 can include one or more computing devices that operate in a cluster or other grouped configuration to share resources, balance load, increase performance, provide fail-over support or redundancy, or for other purposes. For instance, network device(s) 112 system can be server-type devices. The devices 102, 122, 124 that can be registered to the user account 120 and/or the devices 102, 122, 124 into which the user can be logged can be a variety of different classes including desktop computer-type devices, mobile-type devices, special purpose-type devices, etc. For example, a device a user can employ to work on a task can include, but is not limited to, a desktop computing device, a laptop computing device, a tablet computing device, a mobile phone device such as a smartphone, a game console and/or a gaming device, a personal data assistant (PDA) device, a telecommunication device, a wearable device such as a smartwatch, a work station, an augmented or virtual reality device, an Internet-of-Things (IoT) device, an embedded device, a whiteboard device, a video conference device, or any other sort of computing device. As described above, the devices 102, 122, 124 may be user devices or shared devices (e.g., a whiteboard device in a conference room into which multiple different users may log at any given time). While FIG. 1 shows a laptop device as the working device 102 and a smartphone device as the distractive device 122, the roles can be reversed such that the smartphone device can be the working device 102 and the laptop device can be the distractive device 122.

The single illustrated module in FIG. 1 is just an example, and the number of modules may be higher. That is, functionality described in association with the illustrated module can be performed by a larger number of modules depending on a configuration of a device. Further, functionality described in association with the illustrated module can be spread across multiple devices. In one example, the connected focus mode module 116 can be implemented at the user device level such that the techniques described herein can be implemented via a direct connection between the working device 102 and the distractive device 122 using the network(s) 114 (e.g., a Bluetooth or other short range connection), without the involvement of the service provider 110.

Figure 2:
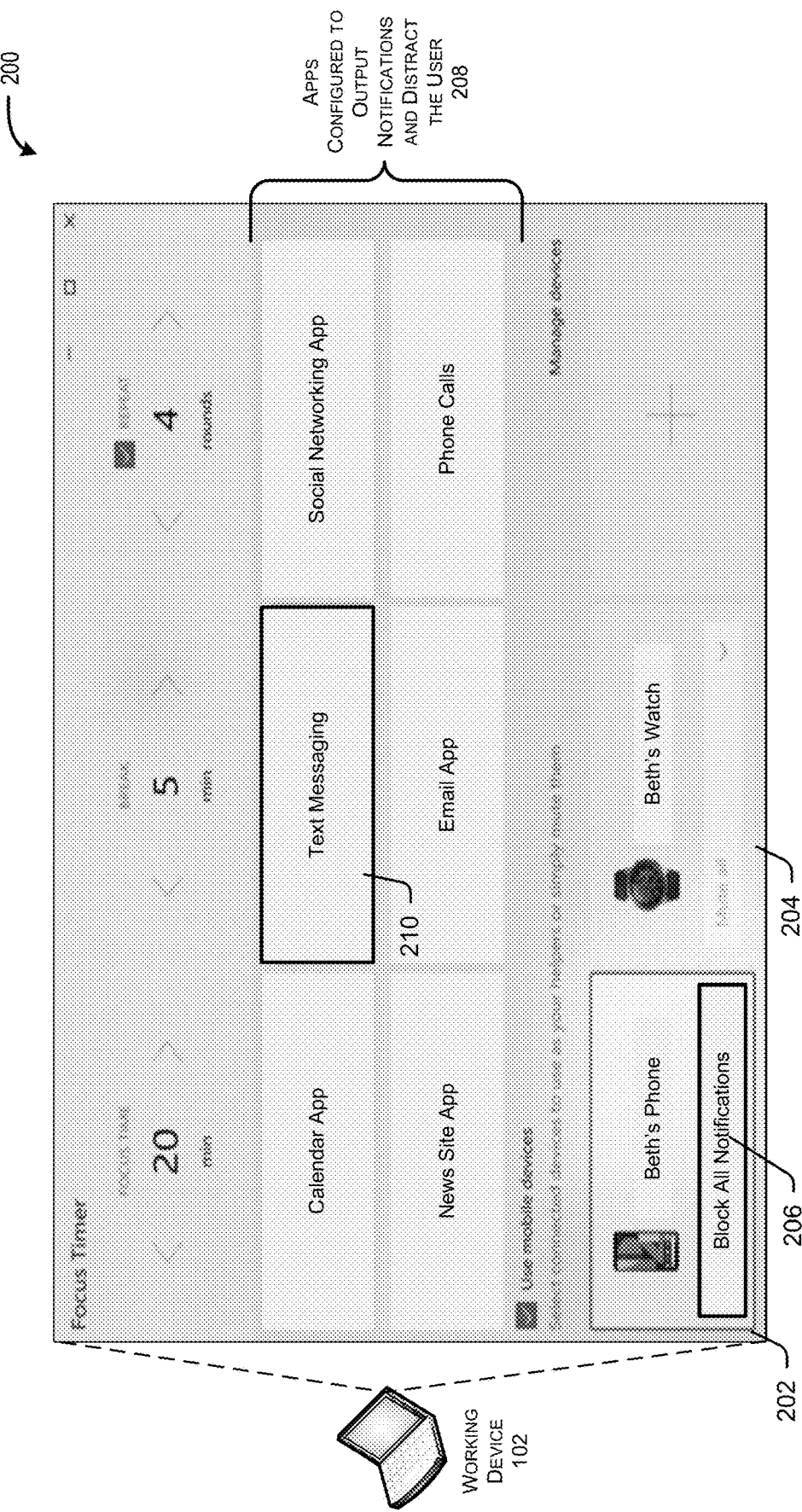
FIG. 2 is an example graphical user interface (UI) illustrating a list of devices that can be selected for the connected focus mode, as well as a list of applications that can be selected for each device so notifications can be blocked.

FIG. 2 is an example graphical user interface (UI) 200 illustrating a list of devices that can be selected by the user for the connected focus mode, as well as a list of applications that can be selected for each device so notifications can be blocked. A "list" can include one or more devices. As shown, the graphical UI 200 is displayed via the working device 102 so the user does not have to set up separate focus sessions on each device that is capable of distracting the user.

When the user "Beth" configures the focus mode 104 for a focus session 106 on the working device 102, the connected focus mode module 116 is configured to use the user account 120 to identify other devices that Beth is currently logged into. The graphical UI 200 shows that in addition to the working device 102, the user "Beth" is currently logged into a smartphone 202 (e.g., "Beth's phone") and a smartwatch 204 (e.g., "Beth's Watch). Accordingly, Beth can select the smartphone 202 and/or the smartwatch 204 in order to have the focus mode 104 extended to other devices that may serve as a distraction. Beth may select all the devices listed in the graphical UI 200 or individual ones of the listed devices. FIG. 2 illustrates that Beth has selected her smartphone 202. In some instances, a default setting may automatically designate all of the devices listed as distractive devices in order to have the focus mode 104 extended to all the devices.

The connected focus mode module 116 enables user selection at the device level because Beth may have valid reasons to not select one of her devices on the list so that the focus mode is not configured and the non-selected device is still able to output notifications during the focus session. For instance, Beth may have a health condition and one of her devices may somehow be involved in monitoring health data and outputting corresponding notifications that are important to Beth's health (e.g., heart rate is too high, blood sugar is too low, etc.).

Provided that different devices are involved it is possible that an application installed on one device does not have a corresponding version of the same application installed on another device. Consequently, the connected focus mode module 116 provides an effective and efficient way for a user to extend a focus mode, for a focus session to be implemented on a first device, to applications that are not installed on the first device but rather on a second device that is identified as being a distraction for a focus session via the use of a common account.

In one example, the connected focus mode module 116 enables Beth to quickly select an option 206 to have all notifications from all applications installed on her smartphone 202 to be blocked during the focus session 106. In an alternative example, upon selection of a device (e.g., Beth's smartphone 202) and if the option 206 is not selected, the connected focus mode module 116 is configured to display the individual applications that are installed on the device and/or configured to output notifications that can potentially distract Beth 208. The connected focus mode module 116 presents Beth with the option to select which applications, installed on her smartphone 202, are to have their notifications prevented from being output (e.g., blocked or suppressed). As shown in FIG. 2, Beth is currently selecting the text messaging application 210 and may subsequently select the calendar application, the social networking application, the news site application, the email application, and/or the phone call application. Alternatively, and depending on the configuration of the graphical UI 200, a selection of an application may indicate that the user does not want notifications blocked and a non-selection of an application may indicate that the user does want notifications blocked.

The connected focus mode module 116 can provide an instruction to configure the focus mode 104 to the smartphone 202 based on the selection(s) described with respect to the graphical UI 200 of FIG. 2. Consequently, a user selection, or lack thereof, enables notifications from particular applications to still be output during the focus session 106. Going back to the example mentioned above but on a more granular application level, Beth may have a health condition and a health application installed on her smartphone 202 may somehow be involved in monitoring health data and outputting corresponding notifications that are important to Beth's health (e.g., heart rate is too high, blood sugar is too low, etc.). Accordingly, Beth may want to ensure that notifications from this health application are not suppressed, so Beth would not select the health application for notification blocking.

Figure 3:
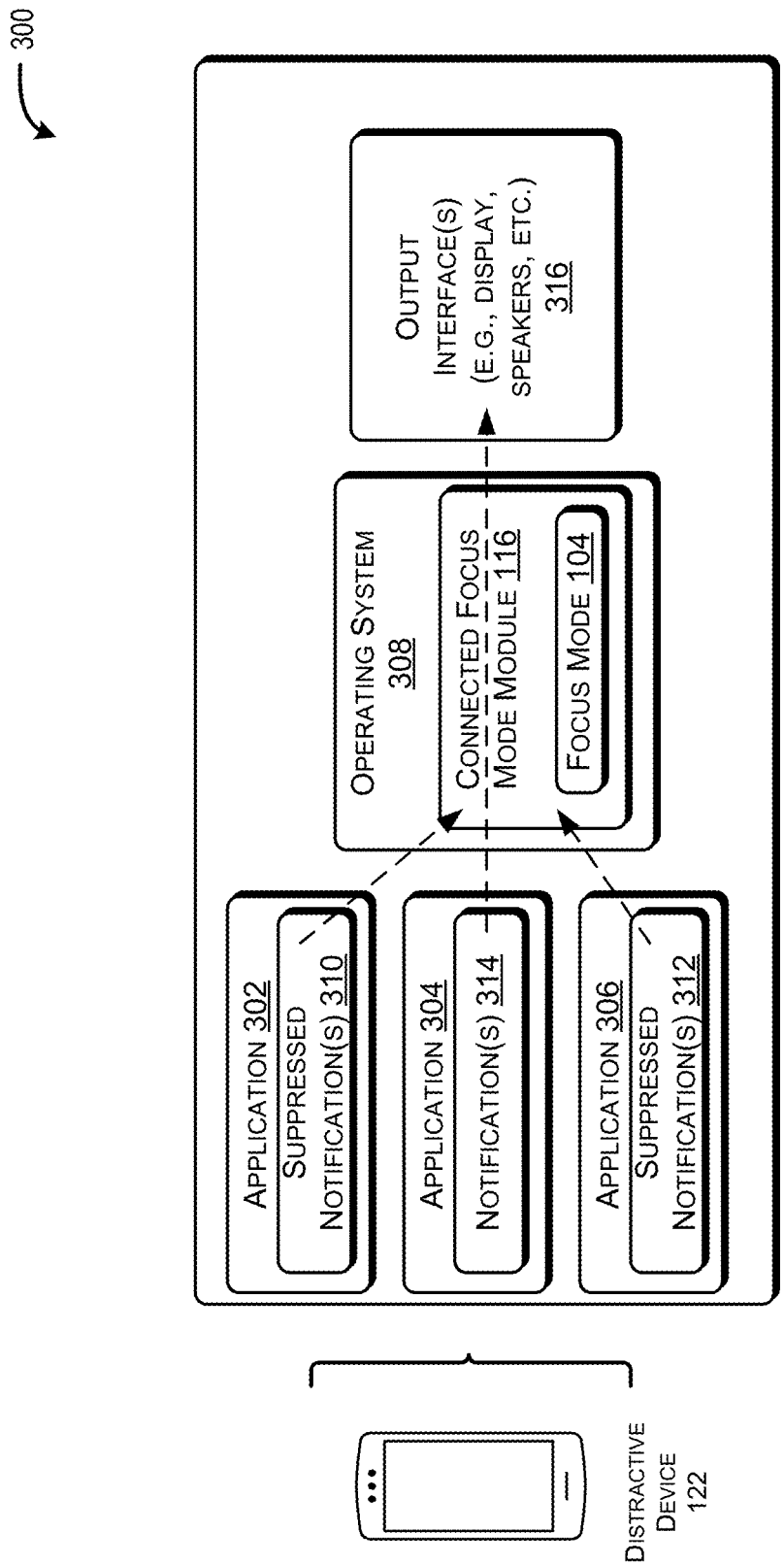
FIG. 3 is a diagram illustrating how notifications can be blocked and/or passed through depending on a user selection of an application, or lack thereof.

FIG. 3 is a diagram 300 illustrating how notifications can be blocked and/or passed through on the distractive device 122 depending on a user selection of applications. The diagram illustrates that applications 302, 304, and 306 are installed on the distractive device 122, and that an operating system 308 of the distractive device 122 has configured a component (e.g., the connected focus mode module 116) to implement the focus mode 104 for the focus session 106. Applications 302 and 306 have been selected as applications to which the focus mode 104 is to be applied, and thus, FIG. 3 illustrates that applications 302 and 306 have suppressed notifications 310 and 312. In contrast, application 304 has not been selected as an application to which the focus mode 104 is to be applied, and thus, FIG. 3 illustrates that the notifications 314 generated by application 304 are passed through by the connected focus mode module 116 for output by output interface(s) 316 (e.g., a display, speaker, haptic feedback mechanisms, etc.).

In some embodiments, when the distractive device 122 is in the focus mode 104, the connected focus mode module 116 is configured to automatically generate a response message to a suppressed notification 310 or 312 from application 302 and/or 306. The response message can indicate that the user is in the focus session 106 and the response message can be sent to the source of the notification (e.g., a user contact that sent a communication such as an email, a text message, or social networking message). Furthermore, when the distractive device 122 is configured in the focus mode 104 for the focus session 106, the connected focus mode module 116 can automatically change an application status indicator for the user to indicate the user is focusing and does not want to be distracted.

Figure 4A:
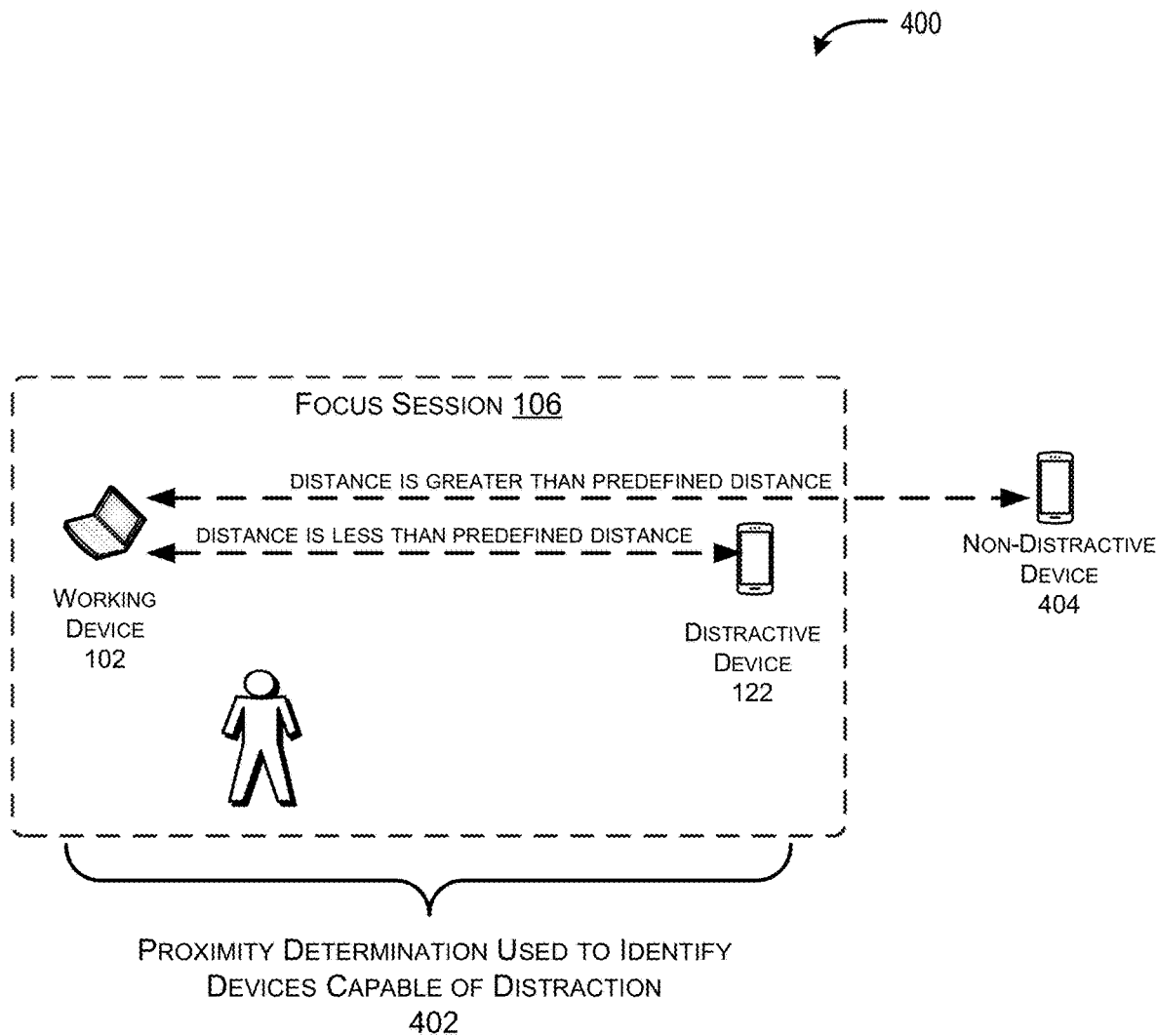
FIG. 4A is a diagram illustrating how a predefined distance used to determine proximity between two devices can identify a distractive device.

FIG. 4A is a diagram 400 illustrating how a predefined distance used to determine proximity between two devices can identify a distractive device 402. In this example, the connected focus mode module 116 uses a locating system (e.g., Global Positioning System, location-based IP address tracking, etc.) to obtain location data of the devices into which the user is logged via an account. That is, the connected focus mode module 116 can determine that a location of a second device 122 is within a predefined distance of a location of a first device 102. The predefined distance can be established to distinguish between a location where a notification output by the second device is likely to interrupt the user and thus needs to be blocked, and a location where the notification output by the second device is not likely to interrupt the user and thus does not need to be blocked. The predefined distance may be different depending on the environment in which the user is currently located. For example, a predefined distance used in a larger home setting may be greater than a predefined distance used in a smaller office setting, or vice versa.

If the location of the second device 122 is within the predefined distance of the location of the working device 102 (i.e., the distance between the two device is less than the predefined distance), the second device 122 can be identified as a likely distractive device to which the focus session 106 is extended. In contrast, FIG. 4A shows that if the location of another device 404 is outside the predefined distance of the location of the working device 102 (i.e., the distance between the two device is greater than the predefined distance), the other device 404 can be identified as a likely non-distractive device.

Figure 4B:
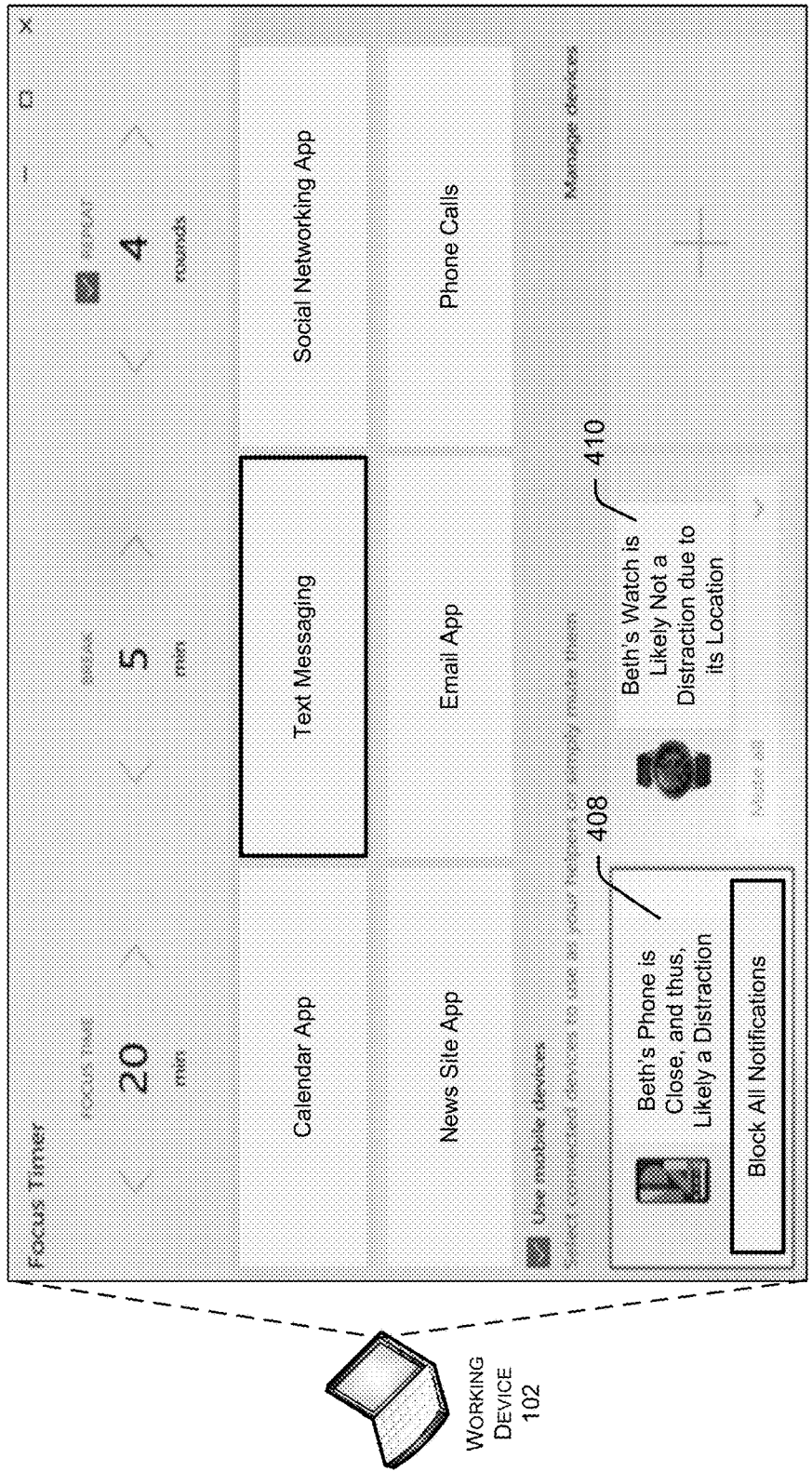
FIG. 4B is an example graphical user interface (UI) illustrating an indication that a device has been identified as a distractive device because the device is located within a predefined distance of a working device.

FIG. 4B is an example graphical user interface (UI) 406 illustrating an indication that a device has been identified as a distractive device because the device is located within a predefined distance of a working device. That is, the connected focus mode module 116 can display the proximity determination outcomes to help guide the user in determining which devices should have notifications blocked. The graphical UI 406 expands on the graphical UI 200 of FIG. 2 by providing an indication 408 that Beth's smartphone is close, and thus, likely a distraction. Thus, Beth can take action to block notifications from being output on her smartphone according to the proximity determination. In contrast, the graphical UI 406 provides an indication 410 that Beth's watch is likely not a distraction due to its current location. Thus, Beth is informed that there is no need to block notifications from being output on her smartwatch according to the proximity determination.

Figure 5:
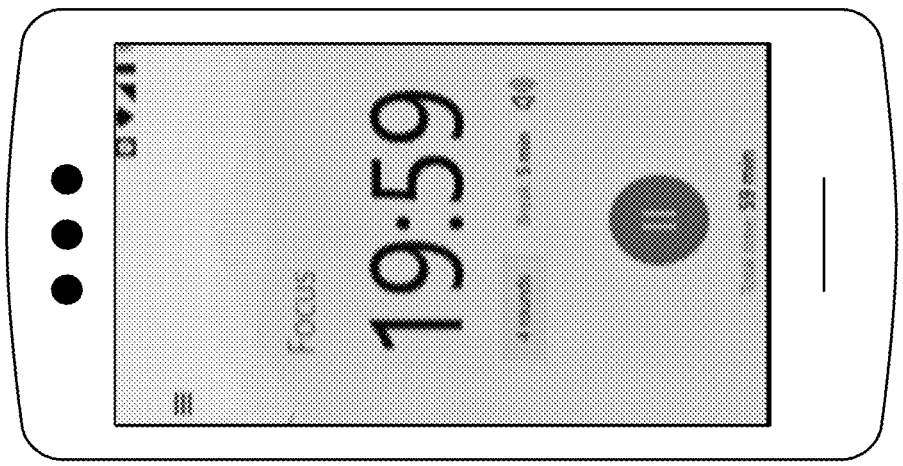
FIG. 5 is an example graphical user interface (UI) illustrating the display of a remaining amount of time in a focus session on a distractive device in order to limit potential distractions on the working device.

FIG. 5 is an example graphical user interface (UI) 500 illustrating the display of a remaining amount of time in a focus session on a distractive device 122 in order to limit potential distractions on the working device 102. The connected focus mode module 116 is configured to present the user with the option to use the display screen of the distractive device 122 to display information for the focus session 106, such as the remaining amount of time until the focus session 106 expires or until a prescheduled break during the focus session 106 occurs (e.g., nineteen minutes and fifty-nine seconds). This option may be presented to the user via the working device, and thus, the connected focus mode module 116 coordinates the display across devices. This further reduces the amount of distraction on the working device 102 with which the user is engaged.

Figure 6:
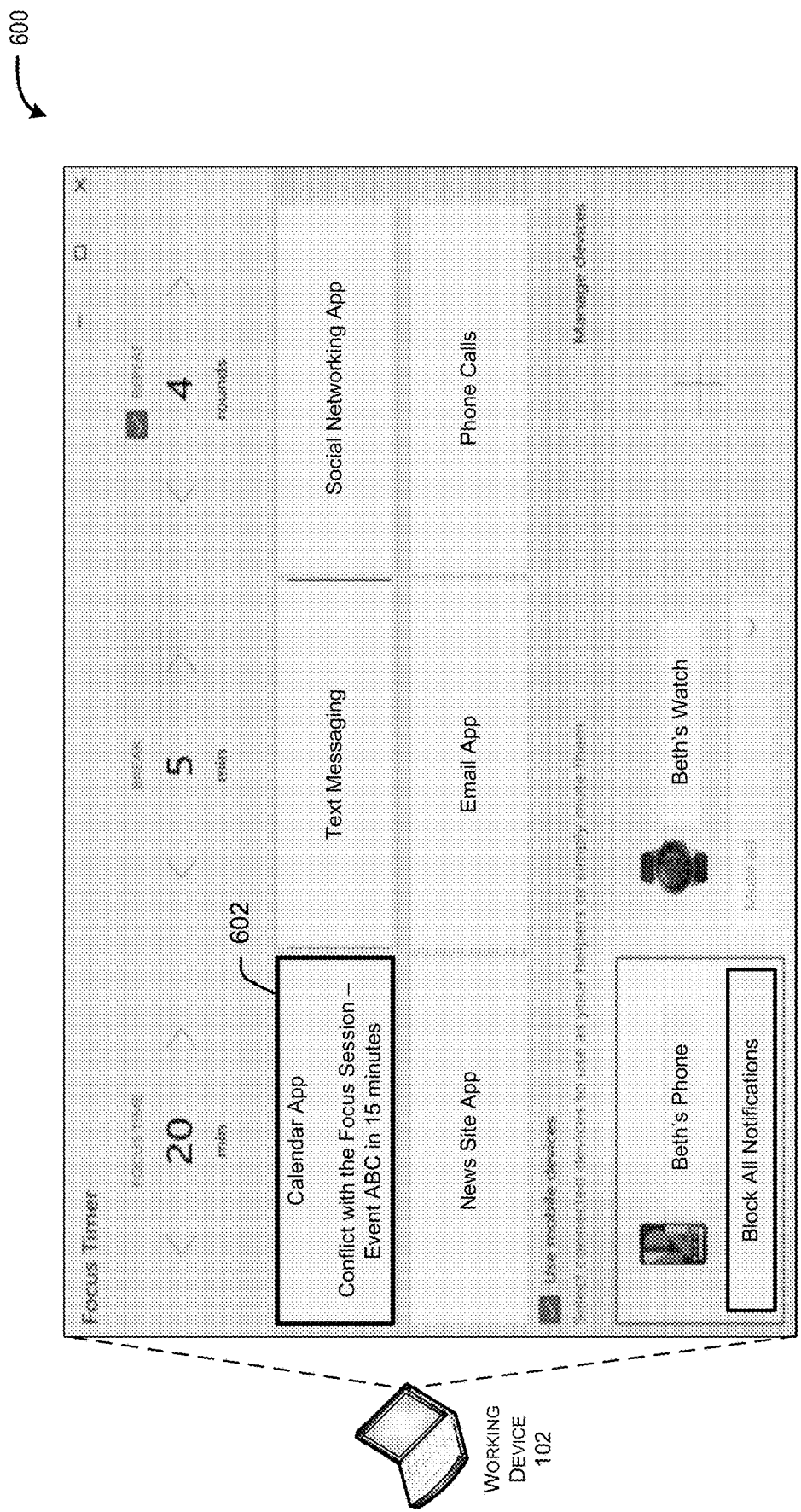
FIG. 6 is an example graphical user interface (UI) illustrating how a user can be notified of a scheduling conflict between the focus session and a time-based event.

FIG. 6 is an example graphical user interface (UI) 600 illustrating how a user can be notified of a scheduling conflict between the focus session and a time-based event. The graphical UI 600 expands on the graphical UI 200 of FIG. 2, where Beth has selected her smartphone as a distractive device in order to have the focus mode 104 pushed to the smartphone. In response to the indication that the focus mode 104 is to be configured on Beth's smartphone, but before the focus session 106 actually starts, the connected focus mode module 116 can perform an analysis of the smartphone and/or the selected applications for which notifications are to be suppressed on the smartphone in order to identify future events for which a time-based notification is scheduled to be output during the focus session 106.

For example, the calendar application on Beth's smartphone may be a personal calendar that is not installed on the working device 102 nor synched to a work calendar application installed on the working device 102. Thus, the scheduled events on the personal calendar of Beth's smartphone may not be visible to her via the working device 102. Instead, Beth may solely rely on the time-based reminders of certain events output by her smartphone when she forgets about her personal schedule.

Accordingly, the connected focus mode module 116 may be configured to identify a conflict that results when a scheduled event-based notification is to be output via a distractive device 122 during the focus session 106. The connected focus mode module 116 can then remind Beth via the working device 102, before the focus session 106 begins, of the scheduled event. As shown, the graphical UI 600 notifies Beth that the calendar application installed on her smartphone includes a "conflict with the focus session" due to "Event ABC set to occur in fifteen minutes" 602. In a more specific example, event ABC may include picking up a pet from the veterinarian, and Beth may have forgotten about this event since it is not a regular occurring event. The reminder 602 may further ask the user if the scheduled event ABC can be ignored or whether the focus session 106 needs to be changed so the user can accommodate a previous commitment (e.g., Beth telling her spouse that she will pick up the pet from the veterinarian).

Figure 7:
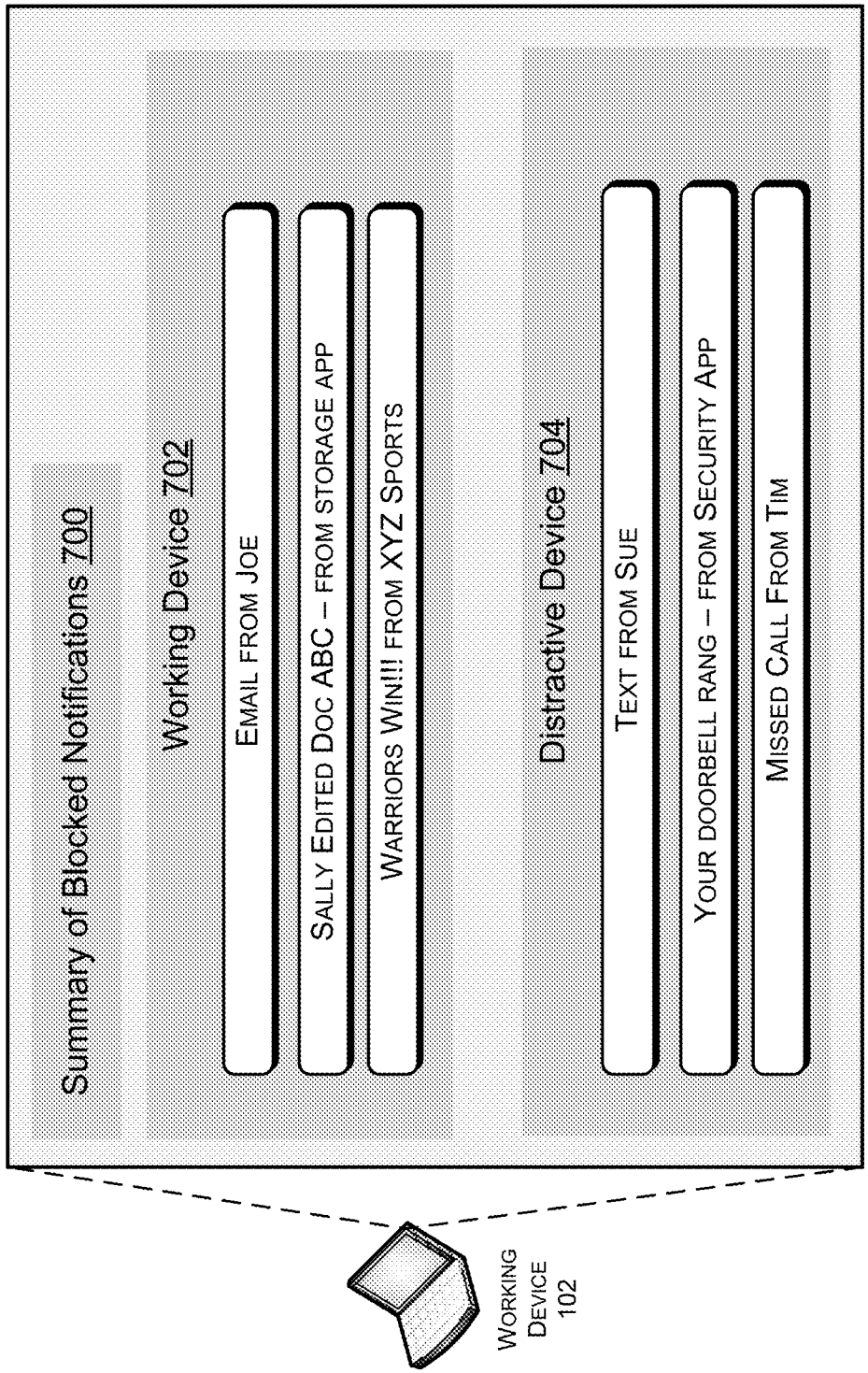
FIG. 7 is an example graphical user interface (UI) illustrating a summary of blocked notifications that can be output when the focus session has ended or when the focus session encounters a scheduled break.

FIG. 7 is an example graphical user interface (UI) 700 illustrating a summary of blocked notifications that can be output when the focus session 106 has ended or when the focus session 106 encounters a scheduled break. The notifications can be sorted and/or displayed based on a respective device that outputs the notifications. Accordingly, the graphical UI 700 shows blocked notifications for the working device in a first area 702, and blocked notifications for a distractive device in a second area 704. The summary of notifications 700 is displayed to the user on the working device 102, so that the user does not need to check different devices in order to see the notifications that were missed while the user was in the focus session 106. Moreover, the notifications can be displayed in a prioritized order for the respective devices based on perceived importance. Consequently, the user can quickly catch up on what was missed during the focus session or during a segment of the focus session.

Figure 8:
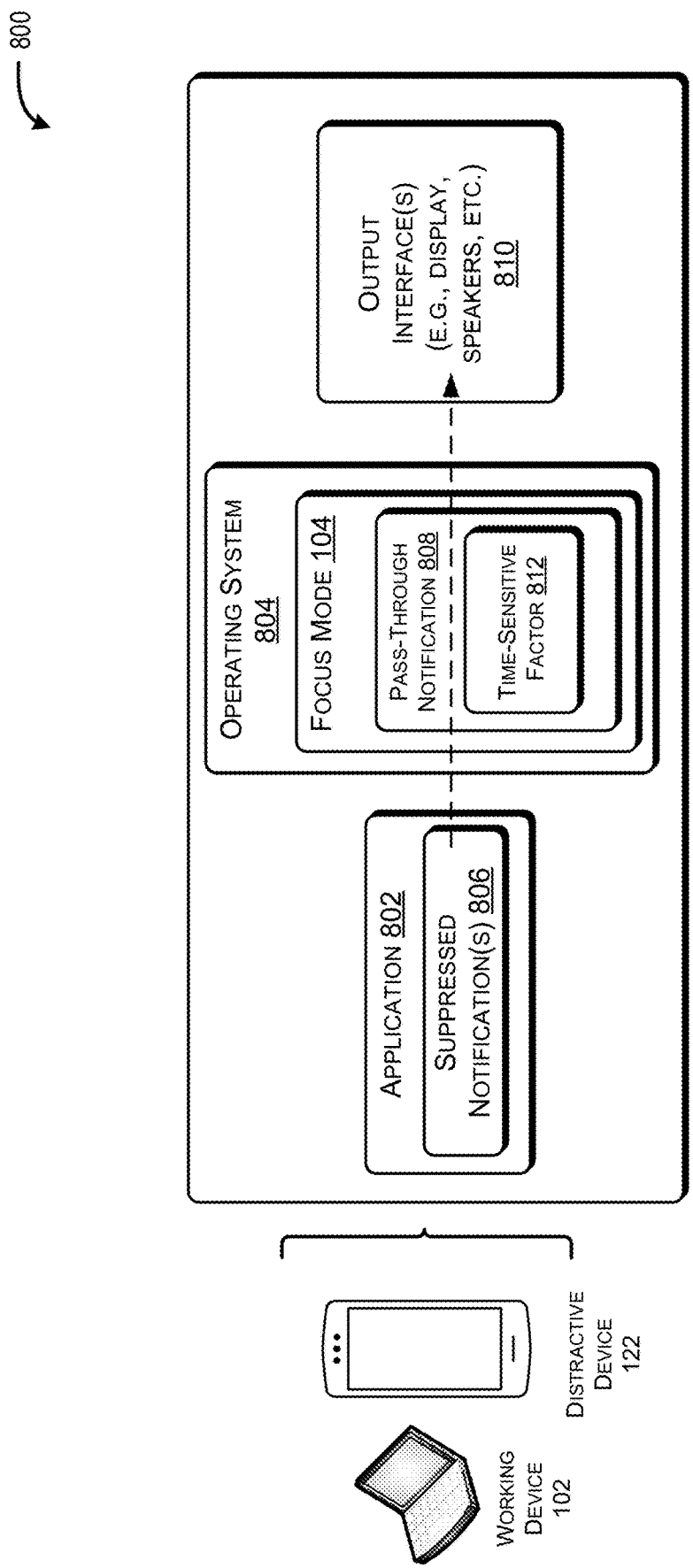
FIG. 8 is a diagram illustrating how notifications can be passed through depending on a time-sensitive factor.

FIG. 8 is a diagram 800 illustrating how notifications can be passed through depending on a time-sensitive factor. The diagram illustrates that an application 802 is installed on the working device and/or the distractive device 122, and that an operating system 804 of a respective device has configured a component (e.g., the connected focus mode module 116) to implement the focus mode 104 for the focus session 106. Accordingly, the focus mode 104 suppresses notifications 806 that are generated by application 802 during the focus session 106.

In some embodiments, the connected focus mode module 116 can implement a filter that allows some notifications 808 that should be suppressed to be passed through for output by output interfaces 810 during the focus session 106. These notifications 808 may be passed through in accordance with a time-sensitive factor 812 or a time-sensitive analysis, and thus, may be referred to herein as a time-sensitive notification 808.

In one example, the time-sensitive factor 812 used by the connected focus mode module 116 to classify a notification as time-sensitive can include a determination that the notification is a repeat notification that has been generated a threshold number of times (e.g., two, three, four, etc.). In this example, the repeat notification is determined to be the same with respect to content (e.g., what is being communicated and why) and/or source (e.g., who sent the communication that caused the notification) as the previous notification. The connected focus mode module 116 is therefore configured to analyze notifications to identify repeat notifications that are the same with respect to content and/or source as a previous notification, and thus, the repeat notification may be indicative of an urgent or emergency situation. In a specific scenario, a spouse may call the user three different times (e.g., the threshold is three), and thus, a notification of the third call can penetrate the filter of the focus mode 104 and be output. Or the spouse may text the user two different times indicating in some form for the user to call back immediately (e.g., the threshold is two), and thus, a notification of the second text message can penetrate the filter of the focus mode 104 and be output. Time-sensitive notifications 808 passed through due to repeat attempts that meet a threshold may be limited to those associated with user identifications (e.g., names, titles, etc.) included on a predefined list of "important" or "favorite" people of a user (e.g., a mother, a father, a spouse, a child, a supervisor, a coach, a counselor, a doctor, etc.).

In another example, the time-sensitive factor 812 used by the connected focus mode module 116 to classify a notification as a time-sensitive notification 808 can include a new time-based event that is scheduled and/or set to occur during the focus session 106. For instance, perhaps a supervisor schedules a last second meeting during the focus session 106, and thus, the user could not have been aware of the meeting at the onset of the focus session 106. Accordingly, the connected focus mode module 116 can analyze the content of the meeting request received during the focus session 106 to identify that the meeting time is also during the focus session 106 and the connected focus mode module 116 passes through the meeting request so the user does not miss an important discussion with his or her work team. Or perhaps a spouse has an unexpected matter to attend to and therefore sends a text message indicating a change of plans and requesting that the user pick up the kids from school, which would need to happen during the focus session 106. Accordingly, the connected focus mode module 116 can analyze the content of the text message received during the focus session to identify that the kid pickup time is also during the focus session 106 and the connected focus mode module 116 can pass through the text message so the spouse can attend to the unexpected matter, and the user can change his or her schedule so the kids are not left waiting for a ride at school. Similar to the discussion above, time-sensitive notifications passed through due to a time-based event that occurs during the focus session may be limited to those associated with user identifications included on a predefined list of important or favorite people of a user.

In yet another example, the time-sensitive factor 812 used by the connected focus mode module 116 to identify or classify a notification as a time-sensitive notification 808 can include a location-based emergency or urgent warning with important information from an official source such as a government entity (e.g., a tornado has touched down close to the device, an active shooter has been reported near the device, geological sensors have detected an earthquake, an AMBER ALERT has been issued, etc.).

In various examples, the connected focus mode module 116 can use machine learning and/or artificial intelligence to determine which notifications include a time-sensitive factor, and thus, are likely important enough to pass through and penetrate a filter of the focus mode 104. For instance, the connected focus mode module 116 can learn a model based on content and/or stored patterns. The model can be used to identify a time-sensitive situation that a user is more likely to respond to or act upon when viewing a device notification. The model can be any type of predictive model that can be applied to features extracted from a notification. Accordingly, the model can use any one of neural networks, Naïve Bayes, k-nearest neighbor algorithm, majority classifier, support vector machines, random forests, boosted trees, Classification and Regression Trees (CART), and so on.

Figure 9:
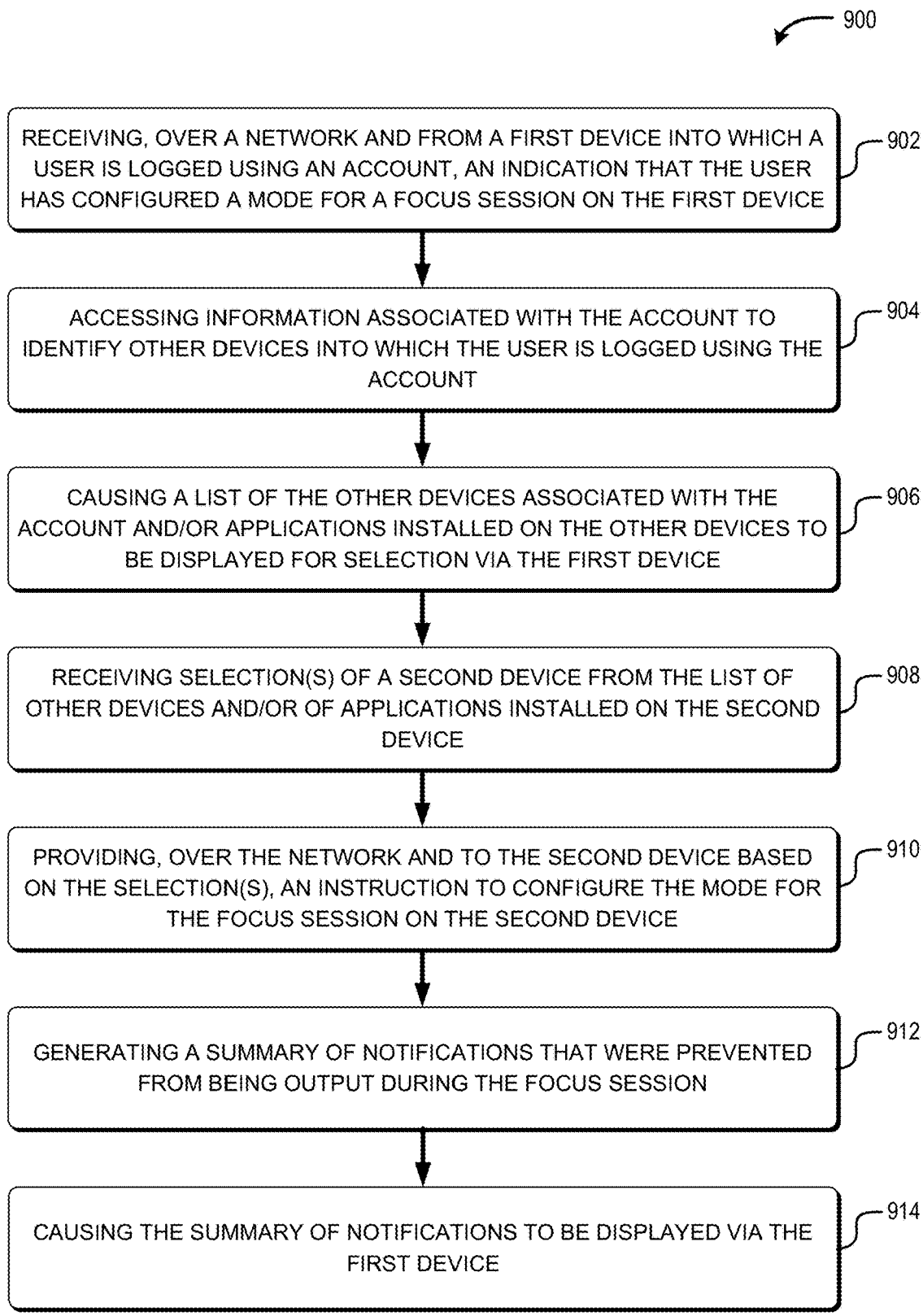
FIG. 9 is a flow diagram of an example method for communicating an instruction to extend a focus mode from a first device to a second device.
Figure 10:
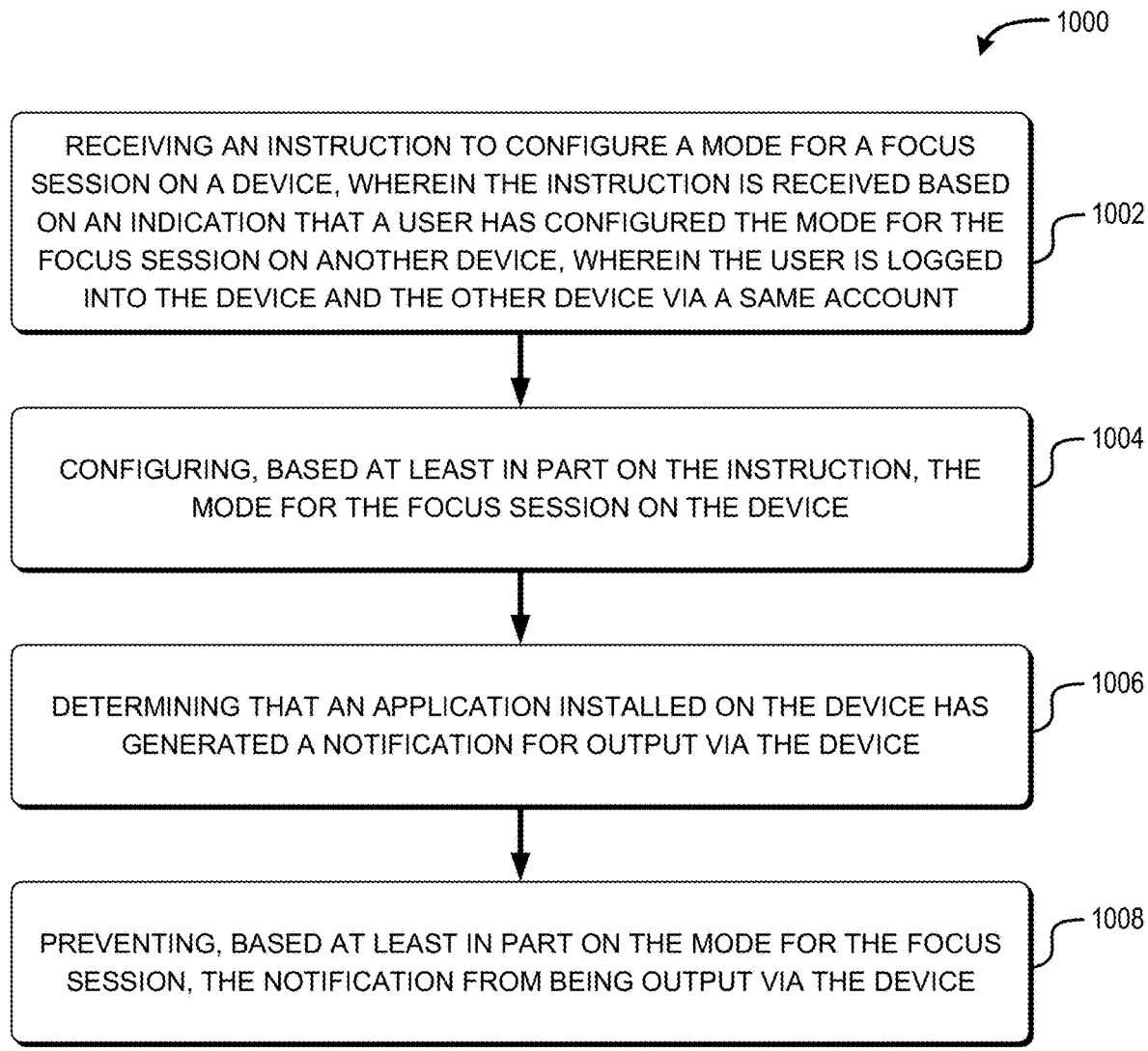
FIG. 10 is a flow diagram of an example method for configuring a device to implement a focus mode that has been established by a user on a different device.
Figure 11:
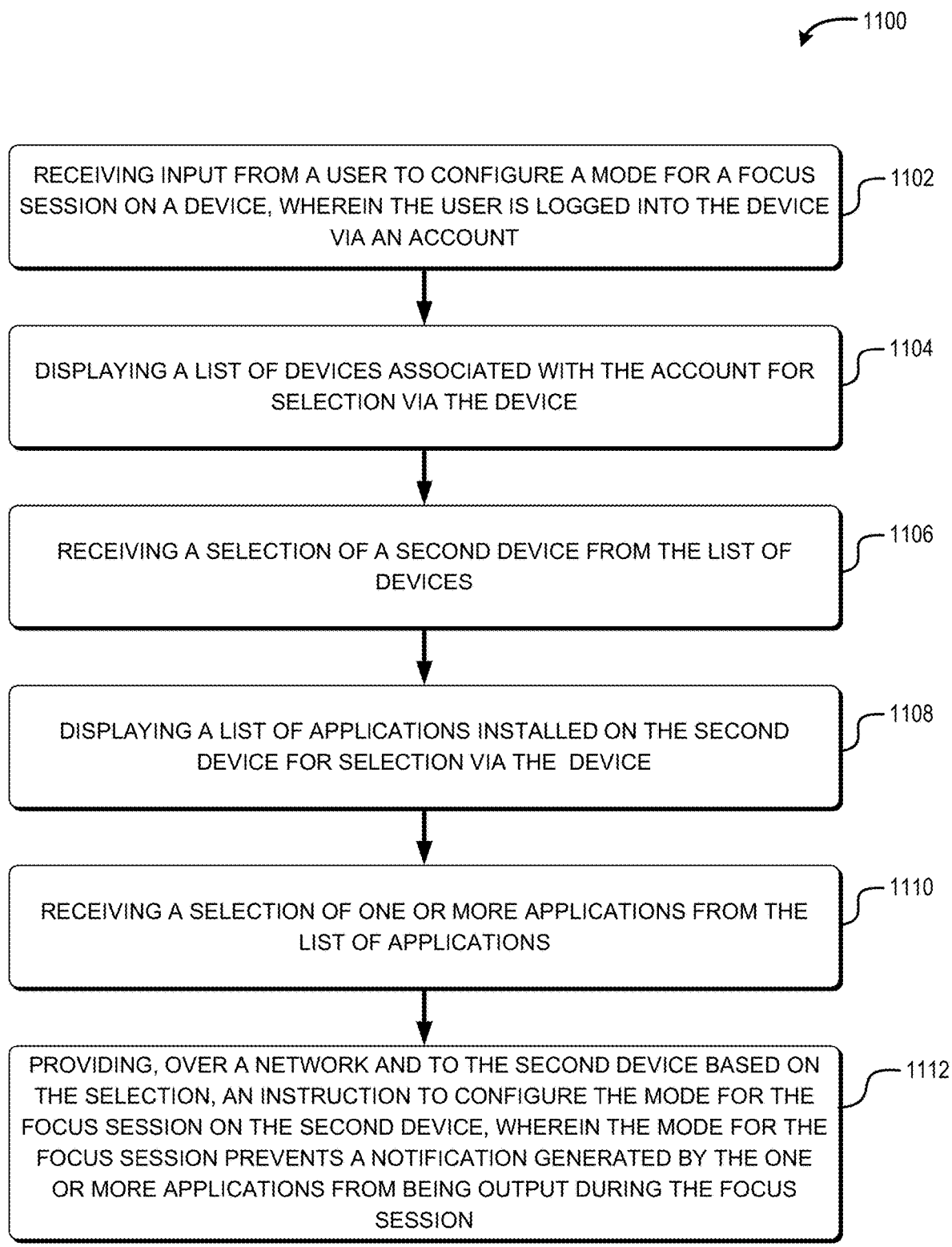
FIG. 11 is a flow diagram of an example method for presenting options for a user to configure a focus mode on additional devices.

FIGS. 9-11 represent example processes in accordance with various examples from the description of FIGS. 1-8. The order in which the operations are described is not intended to be construed as a limitation, and any number of the described operations can be combined in any order and/or in parallel to implement each process. Moreover, the operations in FIGS. 9-11 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations.

FIG. 9 is a flow diagram of an example method 900 for communicating an instruction to extend a focus mode from a first device to a second device. The example method 900 may be performed by a connected focus mode module executing on a network device configured to communicate with a first device (e.g., a working device) and a second device (e.g., a distractive device).

At 902, an indication that a user has configured a mode for a focus session on a first device is received over a network and from the first device into which a user is logged using an account.

At 904, information associated with the account is accessed to identify other devices into which the user is logged using the account.

At 906, a list of the other devices associated with the account and/or applications installed on the other devices is caused to be displayed for selection via the first device.

At 908, a selection of a second device from the list of other devices and/or a selection of applications installed on the second device is received.

At 910, an instruction to configure the mode for the focus session on the second device is provided over the network and to the second device based on the selections.

At 912, a summary of notifications that were prevented from being output during the focus session is generated.

At 914, the summary of notifications is caused to be displayed via the first device.

FIG. 10 is a flow diagram of an example method 1000 for configuring a device to implement a focus mode that has been established by a user on a different device. The example method 1000 may be performed by a connected focus mode module executing on a distractive device.

At 1002, an instruction to configure a mode for a focus session on a device is received. The instruction is received based on an indication that a user has configured the mode for the focus session on another device. The user is logged into the device and the other device via a same account.

At 1004, the mode for the focus session on the device is configured based at least in part on the instruction.

At 1006, it is determined that an application installed on the device has generated a notification for output via the device.

At 1008, the notification is prevented from being output via the device based at least in part on the mode for the focus session.

FIG. 11 is a flow diagram of an example method 1100 for presenting options for a user to configure a focus mode on additional devices. The example method 1100 may be performed by a connected focus mode module executing on a working device.

At 1102, input from a user to configure a mode for a focus session on a device is received. The user is logged into the device via an account.

At 1104, a list of devices associated with the account is displayed for selection via the device.

At 1106, a selection of a second device from the list of devices is received.

At 1108, a list of applications installed on the second device is displayed for selection via the device.

At 1110, a selection of one or more applications from the list of applications is received.

At 1112, an instruction to configure the mode for the focus session on the second device is provided over a network and to the second device based on the selections. The mode for the focus session prevents a notification generated by the one or more applications installed on the second device from being output during the focus session.

Figure 12:
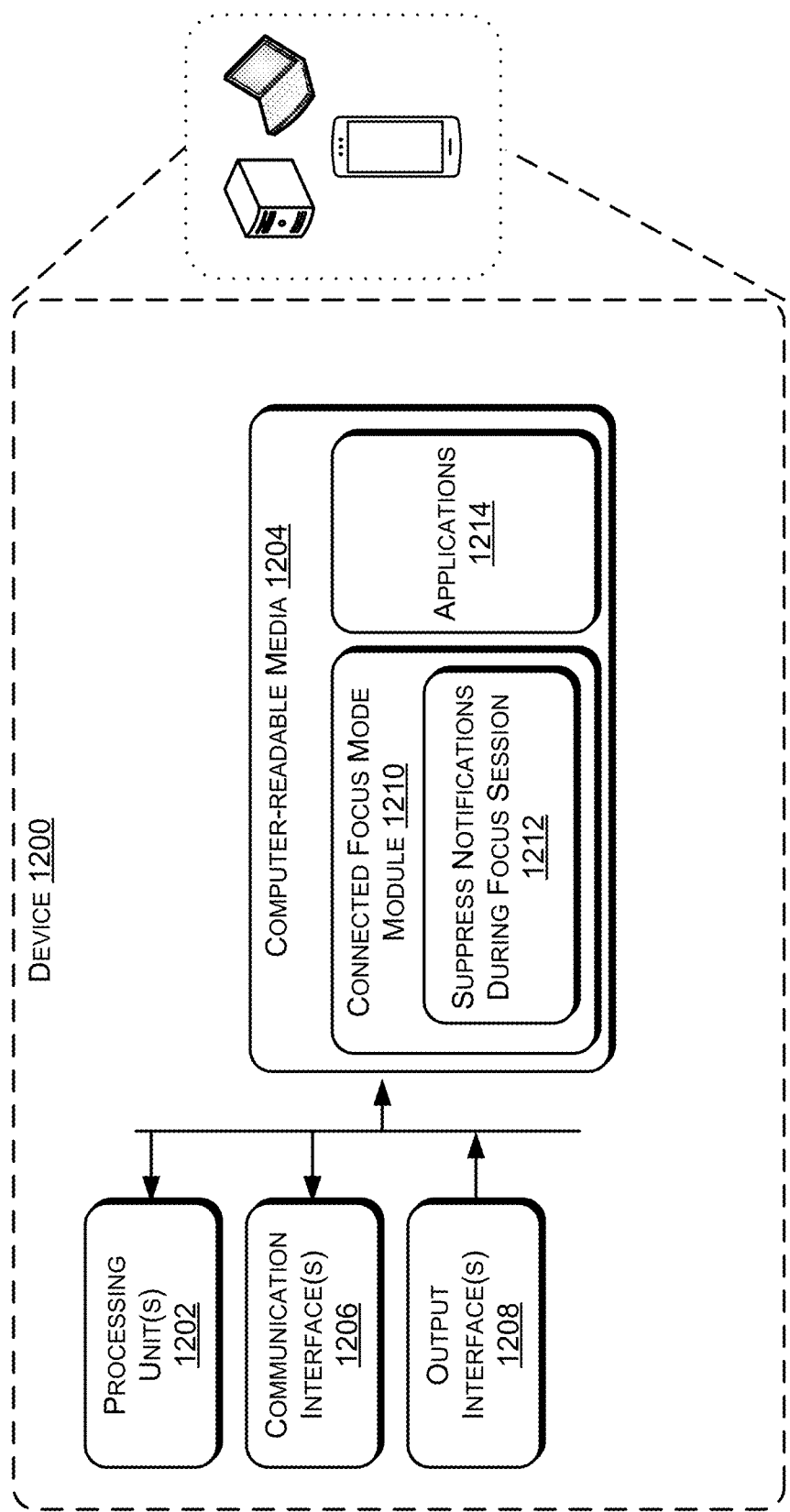
FIG. 12 illustrates an example device configured to perform the techniques described herein.

FIG. 12 illustrates an example device 1200 (e.g., a working device, a distractive device, a network device such as a server). The device 1200 includes processing unit(s) 1202, computer-readable media 1204, communication interface(s) 1206, and/or output interface(s) 1208 (e.g., display, speakers, haptic feedback mechanisms, etc.). The computer-readable media 1204 includes a connected focus mode module 1210 (e.g., connected focus mode module 116) that is configured to suppress notifications during a focus session 1212 (e.g., focus session 106), the notifications being generated by various applications 1214 installed on the device 1200.

The functionality described herein in association with the illustrated modules may be performed by a fewer number of modules or a larger number of modules. As utilized herein, processing unit(s), such as the processing unit(s) 1202, may represent, for example, a CPU-type data processing unit, a GPU-type data processing unit, a field-programmable gate array ("FPGA"), digital signal processors ("DSPs"), a microcontroller, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204, may store instructions executable by the processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s), such as communication interface(s) 1206, may represent, for example, network interface controllers ("NICs") or other types of transceiver devices to send and receive communications over a network such as network(s) 114. Network(s) 114 can include, for example, public networks such as the Internet, private networks such as an institutional and/or personal intranet, or some combination of private and public networks. Network(s) 114 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, 5G, and so forth) or any combination thereof. Network(s) 114 can utilize communications protocols, including packet-based and/or datagram-based protocols such as internet protocol (IP), transmission control protocol (TCP), user datagram protocol (UDP), or other types of protocols. Moreover, network(s) 114 can also include a number of devices that facilitate network communications and/or form a hardware basis for the networks, such as switches, routers, gateways, access points, firewalls, base stations, repeaters, backbone devices, and the like. In further examples, network(s) 114 can include short range or direct communications between two user devices (e.g., a Bluetooth connection).

It should be appreciated that the software components described herein may, when loaded into the processing unit(s) 1202 and executed, transform the processing unit(s) 1202 and the overall computing architecture from a general-purpose computing system into a special-purpose computing system customized to facilitate the functionality presented herein. The processing unit(s) 1202 may be constructed from any number of transistors or other discrete circuit elements, which may individually or collectively assume any number of states. More specifically, the processing unit(s) 1202 may operate as a finite-state machine, in response to executable instructions contained within the software modules disclosed herein. These computer-executable instructions may transform the processing unit(s) 1202 by specifying how the processing unit(s) 1202 transition between states, thereby transforming the transistors or other discrete hardware elements constituting the processing unit(s) 1202.

The disclosure presented herein also encompasses the subject matter set forth in the following clauses.

Example Clause A, a system comprising: at least one processing unit; and memory storing instructions that, when executed by the at least one processing unit, cause the system to perform operations comprising: receiving, over a network and from a first device into which a user is logged using an account, an indication that the user has configured a mode for a focus session on the first device, wherein the mode for the focus session prevents one or more first notifications generated by one or more first applications installed on the first device from being output during the focus session; accessing information associated with the account to identify a second device into which the user is logged using the account; and providing, over the network and to the second device, an instruction to configure the mode for the focus session on the second device, wherein the mode for the focus session prevents one or more second notifications generated by one or more second applications installed on the second device from being output during the focus session.

Example Clause B, the system of Example Clause A, wherein the operations further comprise: causing a list of devices associated with the account to be displayed for selection via the first device; and receiving a selection of the second device from the list of devices, wherein the instruction is provided to the second device based on the selection of the second device.

Example Clause C, the system of Example A or Example Clause B, wherein the operations further comprise: causing a list of applications installed on the second device to be displayed for selection via the first device; and receiving a selection of the one or more second applications from the list of applications, wherein the instruction is provided to the second device based on the selection of the one or more second applications.

Example Clause D, the system of any one of Example Clauses A through C, wherein the operations further comprise determining that a location of the second device is within a predefined distance of a location of the first device, wherein the second device is identified based on the determining that the location of the second device is within the predefined distance of the location of the first device.

Example Clause E, the system of Example Clause D, wherein the second device is identified as a distractive device based on the determining that the location of the second device is within the predefined distance of the location of the first device, and the operations further comprise causing an indication that the second device has been identified as the distractive device to be displayed via the first device.

Example Clause F, the system of any one of Example Clauses A through E, wherein at least one of the one or more second applications is not installed on the first device.

Example Clause G, the system of any one of Example Clauses A through F, wherein the operations further comprise causing a remaining amount of time until the focus session expires to be displayed via the second device.

Example Clause H, the system of any one of Example Clauses A through G, wherein the operations further comprise: generating a summary of notifications, from the one or more first applications and the one or more second applications, that were prevented from being output during the focus session; and causing the summary of notifications to be displayed via the first device.

Example Clause I, the system of any one of Example Clauses A through H, wherein: the first device comprises one of a desktop device, a tablet device, or a laptop device; and the second device comprises one of a smartphone device or a smartwatch device.

Example Clause J, the system of any one of Example Clauses A through I, wherein the operations further comprise: determining that a second application of the one or more second applications includes a scheduled event during the focus session, wherein the second application is not installed on the first device; and prior to the focus session, cause a reminder of the scheduled event to be displayed via the first device.

Example Clause K, a device comprising: at least one processing unit; and memory storing instructions that, when executed by the at least one processing unit, cause the device to perform operations comprising: receiving an instruction to configure a mode for a focus session on the device, wherein the instruction is received based on an indication that a user has configured the mode for the focus session on another device, wherein the user is logged into the device and the other device via a same account; configuring, based at least in part on the instruction, the mode for the focus session on the device; determining that an application installed on the device has generated a notification for output via the device; and preventing, based at least in part on the mode for the focus session, the notification from being output via the device.

Example Clause L, the device of Example Clause K, wherein the operations further comprise: determining that the application installed on the device has generated another notification that is classified as time-sensitive; and allowing the time-sensitive notification to pass through and be output via the device during the focus session.

Example Clause M, the device of Example Clause L, wherein the other notification is classified as time-sensitive based on a determination that the other notification is a repeat notification that has been generated a threshold number of times.

Example Clause N, the device of Example Clause L, wherein the other notification is classified as time-sensitive based on a time-based event that occurs during the focus session.

Example Clause O, the device of Example Clause L, wherein the other notification is classified as time-sensitive based on an identification of another user who is a source of a communication that caused the other notification to be generated.

Example Clause P, the device of any one of Example Clauses K through O, wherein the operations further comprise: automatically generating a response message to a source of the notification, the response message indicating that the user is in the focus session; and sending the response message to the source of the notification.

Example Clause Q, a device comprising: at least one processing unit; and memory storing instructions that, when executed by the at least one processing unit, cause the device to perform operations comprising: receiving input from a user to configure a mode for a focus session on the device, wherein the user is logged into the device via an account, wherein the mode for the focus session prevents one or more first notifications generated by one or more first applications installed on the device from being output during the focus session; displaying a list of devices associated with the account for selection via the device; receiving a selection of a second device from the list of devices; and providing, over a network and to the second device based on the selection, an instruction to configure the mode for the focus session on the second device, wherein the mode for the focus session prevents one or more second notifications generated by one or more second applications installed on the second device from being output during the focus session.

Example Clause R, the device of Example Clause Q, wherein the operations further comprise: displaying a list of applications installed on the second device for selection via the device; and receiving a selection of the second application from the list of applications, wherein the instruction is provided to the second device based on the selection of the second application.

Example Clause S, the device of Example Clause Q or Example Clause R, wherein the operations further comprise: generating a summary of notifications, from the one or more first applications and the one or more second applications, that were prevented from being output during the focus session; and displaying the summary of notifications via the device.

Example Clause T, the device of any one of Example Clauses Q through S, wherein at least one of the one or more second applications is not installed on the device.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the disclosed subject matter are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different devices, two different notifications, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A system comprising:
   at least one processing unit; and
   memory storing instructions that, when executed by the at least one processing unit, cause the system to perform operations comprising:
     receiving, over a network and from a first device to which a user is logged in using an account, an indication that the user has configured a mode for a focus session on the first device, wherein the mode for the focus session prevents one or more first notifications generated by one or more first applications installed on the first device from being output during the focus session;
     accessing information associated with the account to identify a second device to which the user is logged in using the device level account;
     determining that a location of the second device is within a predefined distance of a location of the first device;
     identifying the second device as a distractive device based on the determining that the location of the second device is within the predefined distance of the location of the first device
     causing an indication that the second device has been identified as the distractive device to be displayed via the first device; and
     providing, over the network and to the second device, an instruction to configure the mode for the focus session on the second device, wherein:
       the mode for the focus session prevents one or more second notifications generated by one or more second applications installed on the second device from being output during the focus session; and
       the one or more second applications is not installed on the first device.

2. The system of claim 1, wherein the operations further comprise:
   causing a list of devices associated with the account to be displayed for selection via the first device; and
   receiving a selection of the second device from the list of devices, wherein the instruction is provided to the second device based on the selection of the second device.

3. The system of claim 1, wherein the operations further comprise:
   causing a list of applications installed on the second device to be displayed for selection via the first device; and receiving a selection of the one or more second applications from the list of applications, wherein the instruction is provided to the second device based on the selection of the one or more second applications.

4. The system of claim 1, wherein the operations further comprise causing a remaining amount of time until the focus session expires to be displayed via the second device.

5. The system of claim 1, wherein the operations further comprise:
generating a summary of notifications, from the one or more first applications and the one or more second applications, that were prevented from being output during the focus session; and
causing the summary of notifications to be displayed via the first device.

6. The system of claim 1, wherein:
the first device comprises one of a desktop device, a tablet device, or a laptop device; and
the second device comprises one of a smartphone device or a smartwatch device.

7. The system of claim 1, wherein the operations further comprise:
determining that a second application of the one or more second applications includes a scheduled event during the focus session; and
prior to the focus session, cause a reminder of the scheduled event to be displayed via the first device.

8. A device comprising:
at least one processing unit; and
memory storing instructions that, when executed by the at least one processing unit, cause the device to perform operations comprising:
receiving an instruction to configure a mode for a focus session on the device, wherein:
the instruction is received based on an indication that a user has configured the mode for the focus session on another device and a location of the device is determined to be within a predefined distance of a location of the other device thereby identifying the device as a distractive device;
use of both the device and the other device is enabled for the user via an account; and
an indication that the device has been identified as the distractive device is displayed via the other device;
configuring, based at least in part on the instruction, the mode for the focus session on the device;
determining that an application installed on the device has generated a notification for output via the device, wherein the application is not installed on the other device; and
preventing, based at least in part on the mode for the focus session, the notification from being output via the device.

9. The device of claim 8, wherein the operations further comprise:
determining that the application installed on the device has generated another notification that is classified as time-sensitive; and
allowing the time-sensitive notification to pass through and be output via the device during the focus session.

10. The device of claim 9, wherein the other notification is classified as time-sensitive based on a determination that the other notification is a repeat notification that has been generated a threshold number of times.

11. The device of claim 9, wherein the other notification is classified as time-sensitive based on a time-based event that occurs during the focus session.

12. The device of claim 9, wherein the other notification is classified as time-sensitive based on an identification of another user who is a source of a communication that caused the other notification to be generated.

13. The device of claim 8, wherein the operations further comprise:
automatically generating a response message to a source of the notification, the response message indicating that the user is in the focus session; and
sending the response message to the source of the notification.

14. A first device comprising:
at least one processing unit; and
memory storing instructions that, when executed by the at least one processing unit, cause the first device to perform operations comprising:
receiving input from a user to configure a mode for a focus session on the first device, wherein:
use of the first device is enabled for the user via an account; and
the mode for the focus session prevents one or more first notifications generated by one or more first applications installed on the first device from being output during the focus session;
determining that a location of a second device is within a predefined distance of a location of the first device, wherein use of the second device is enabled for the user via the account;
identifying the second device as a distractive device based on the determining that the location of the second device is within the predefined distance of the location of the first device;
displaying the second device for selection via the first device along with an indication that the second device has been identified as the distractive device;
receiving a selection of the second device; and
providing, over a network and to the second device based on the selection, an instruction to configure the mode for the focus session on the second device, wherein:
the mode for the focus session prevents one or more second notifications generated by one or more second applications installed on the second device from being output during the focus session; and
the one or more second applications is not installed on the first device.

15. The first device of claim 14, wherein the operations further comprise:
displaying a list of applications installed on the second device for selection via the first device; and
receiving a selection of the one or more second applications from the list of applications, wherein the instruction is provided to the second device based on the selection of the second one or more second applications.

16. The first device of claim 14, wherein the operations further comprise:
generating a summary of notifications, from the one or more first applications and the one or more second applications, that were prevented from being output during the focus session; and displaying the summary of notifications via the first device.

* * * * *